(12) United States Patent
Brown

(10) Patent No.: US 7,090,411 B2
(45) Date of Patent: Aug. 15, 2006

(54) APPARATUS AND METHOD FOR DIFFUSING LASER ENERGY THAT FAILS TO COUPLE INTO SMALL CORE FIBERS, AND FOR REDUCING COUPLING TO THE CLADDING OF THE FIBER

(76) Inventor: Joe D. Brown, 8317 Front Beach Rd., Suite 21, Panama City Beach, FL (US) 32407

( * ) Notice: Subject to any disclaimer, the term of this patent is extended or adjusted under 35 U.S.C. 154(b) by 0 days.

(21) Appl. No.: 10/875,222

(22) Filed: Jun. 25, 2004

(65) Prior Publication Data

US 2005/0025418 A1  Feb. 3, 2005

Related U.S. Application Data

(63) Continuation-in-part of application No. 10/370,453, filed on Feb. 24, 2003.

(60) Provisional application No. 60/507,106, filed on Oct. 1, 2003, provisional application No. 60/482,455, filed on Jun. 26, 2003, provisional application No. 60/358,309, filed on Feb. 24, 2002.

(51) Int. Cl.
*G02B 6/42* (2006.01)
*A61B 18/22* (2006.01)

(52) U.S. Cl. .............................. 385/92; 385/78; 606/16

(58) Field of Classification Search .................. 385/92, 385/88, 33, 31, 116, 140, 147; 606/17, 89, 606/16
See application file for complete search history.

(56) References Cited

U.S. PATENT DOCUMENTS

| | | | |
|---|---|---|---|
| 3,912,362 A | 10/1975 | Hudson | 350/96 |
| 4,474,429 A | 10/1984 | Yoldas et al. | 350/320 |
| 4,575,181 A | 3/1986 | Ishikawa | 350/96.2 |
| 4,678,273 A | 7/1987 | Vilhelmsson | 350/96.3 |
| 4,737,011 A | 4/1988 | Iri et al. | 350/96.2 |
| 4,762,385 A | 8/1988 | Fuse | 350/96.18 |
| 5,101,457 A | 3/1992 | Blonder et al. | 385/33 |
| 5,132,079 A | 7/1992 | Stewart et al. | 385/15 |
| 5,179,610 A * | 1/1993 | Milburn et al. | 385/92 |
| 5,243,681 A | 9/1993 | Bowen et al. | 385/140 |
| 5,291,570 A * | 3/1994 | Filgas et al. | 385/78 |
| 5,452,392 A * | 9/1995 | Baker et al. | 385/92 |
| 5,490,227 A | 2/1996 | Tanabe et al. | 385/29 |
| 5,619,602 A * | 4/1997 | Sandstrom et al. | 385/31 |
| 5,668,902 A * | 9/1997 | Kurata | 385/88 |
| 5,829,445 A | 11/1998 | Martin et al. | 128/898 |
| 5,946,437 A | 8/1999 | Uchida et al. | 385/77 |
| 6,154,596 A | 11/2000 | Ionov | 385/128 |
| 6,167,177 A | 12/2000 | Sandstrom et al. | 385/100 |
| 6,282,349 B1 | 8/2001 | Griffin | 385/81 |

(Continued)

*Primary Examiner*—Frank G. Font
*Assistant Examiner*—James P. Hughes
(74) *Attorney, Agent, or Firm*—Bacon & Thomas, PLLC

(57) ABSTRACT

A fiber optic connector for coupling focused radiant energy from a laser to a fiber optic conductor includes a secondary transmission path, one or more diffusers and, optionally, one or more internal heat sinks for diffusing radiant energy so as to and thereby minimize damage to the connector. In addition, coupling of the radiant energy to the cladding of the fiber is minimized by stripping or at least partially removing the cladding to reduce the amount of cladding in the area that extends to the focal plane of the radiant energy source, while reduction of higher order propagation modes may optionally be achieved by tapering a section of the fiber in such a manner that light entering the fiber at large critical angles are effectively collimated, i.e., bent towards the axis of the fiber.

16 Claims, 4 Drawing Sheets

U.S. PATENT DOCUMENTS

| | | |
|---|---|---|
| 6,317,550 B1 | 11/2001 | Irie et al. .................... 385/123 |
| 6,332,721 B1 | 12/2001 | Inokuchi ...................... 385/93 |
| 6,347,178 B1 * | 2/2002 | Edwards et al. ............ 385/147 |
| 6,477,295 B1 | 11/2002 | Lang et al. ................... 385/31 |
| 6,488,414 B1 | 12/2002 | Dawes et al. ................. 385/79 |
| 6,595,698 B1 | 7/2003 | Gutierrez et al. ............. 385/85 |
| 6,597,835 B1 | 7/2003 | Jie et al. ....................... 385/33 |
| 2002/0021870 A1 | 2/2002 | Engstrand et al. ............ 385/76 |
| 2002/0071459 A1 * | 6/2002 | Malone et al. ........... 372/29.02 |
| 2003/0118283 A1 | 6/2003 | Healy .......................... 385/33 |

* cited by examiner

APPARATUS AND METHOD FOR DIFFUSING LASER ENERGY THAT FAILS TO COUPLE INTO SMALL CORE FIBERS, AND FOR REDUCING COUPLING TO THE CLADDING OF THE FIBER

This application claims the benefit of U.S. Provisional Application Ser. No. 60/507,106, filed Oct. 1, 2003, and 60/482,455, filed Jun. 26, 2003. U.S. Provisional Application Ser. No. 60/482,455 is a continuation-in-part of U.S. patent application Ser. No. 10/370,453, filed Feb. 24, 2003, which claims the benefit of provisional U.S. Patent Application Ser. No. 60/358,309, filed Feb. 24, 2002, and which is herein incorporated by reference.

BACKGROUND OF THE INVENTION

1. Field of the Invention

This invention relates to improvements over the system disclosed in U.S. Pat. No. 5,179,610, in which radiation that fails to couple,with a small core fiber is transmitted via a secondary transmission path to a "dissipation chamber," a reflector, and an external heat sink that converts the reflected radiation to heat.

The first improvement is to use diffusion to spread-out the errant radiation, thereby minimizing damage caused by the radiation and eliminating the need for a reflector or external heat sink. As a result, the size and cost of the termination is reduced, and the termination can be fitted into existing fiber optic termination apparatus without the need for substantial modification. While an internal heat sink may be included, the heat sink can be made relatively small since it is only required to absorb diffuse radiation.

The second improvement is to strip away or reduce the thickness of the cladding at the coupling end of the fiber to reduce or eliminate launching energy into the cladding of the fiber.

The third improvement is to taper a section of the fiber core and/or cladding to decrease higher order radiant energy propagation modes within the conducting medium.

2. Description of Related Art a. Apparatus to which the Invention may be Applied

The method and apparatus of the invention is especially suitable for use in connection with (but not limited to) relatively small primary optical transmission systems that employ optical fibers, and in particular medical devices such as scalpels or lithotripter fibers, which are typically, but not necessarily, monochromatic. Such optical fibers are especially useful to implement recently developed, minimally invasive surgical techniques.

An example of an apparatus to which the principles of the invention may be applied is illustrated in FIGS. 1 and 2. The apparatus includes a laser system 12 and a standard connector coupler 18 for coupling a connector such as connector 30 shown in FIG. 2, which couples the output of the laser system to a primary optical system such as an optical fiber or fiber cable 32. The laser may be a high energy pulse or continuous wave laser that generates a monochromatic radiant energy output beam 17. For example, the laser system may be a Holmium:YAG laser that generates an output formed of pulses on the order of 250μ seconds in pulse width and energy levels ranging up to 1800 mj/pulse with an average power of 12 Watts. The output beam 17 is passed through a condensing lens to form an output beam 17a that is focused on a spot 17b in the vicinity of input focal plane 16 and centered in a connector coupler 18 mounted on the laser enclosure 15 using respective X, Y, and Z adjustments 12a–12c. When connector 30 shown in FIG. 2 is secured to connector coupler 18 by locking member 40 (which may, for example, be an internally threaded nut), the connector ferrule 31 is ideally centered on focused spot 17b and the distal end of the connector ferrule is at the focal plane 16. In this example, the focused spot size at the focal plane 16 is on the order of 365 microns and the relative power density at the focal plane for a 365 micron spot with an average power of 12 watts is approximately 11.5 kW/cm$^2$. On the other hand, the power density 6 mm beyond the focal plane 16 is reduced by a factor of 50.

Ferrule 31 of connector 30 is typically a metal elongated hollow body member into which is inserted the optical fiber or fiber cable 32. The proximal end has a fiber clearance hole 38 drilled close to the outside diameter of the fiber 35. To secure the fiber 35 to the ferrule 31, a small portion of the fiber optic cable 32 is stripper away exposing the glass fiber 35. Before the stripped fiber is placed inside ferrule 31, an adhesive 34 may be applied to a small portion of exposed fiber 35 and the exposed fiber is passed through the internal diameter of the ferrule to its distal end. The extreme distal portion of the exposed fiber exits the ferrule through fiber clearance hole 38. Later, after adhesive 34 is cured, the exposed fiber 35 is trimmed and polished such that the distal end of the ferrule and the distal end of the fiber 35 are flush. Alternately, the fiber 35 may be secured within the ferrule by crimping a portion of the cable 32 to the ferrule using a sleeve.

b. The Errant Radiation Problem

The errant radiant energy problem arises when the primary optical transmission system approaches or is smaller than the size of the focused beam of radiant energy. For example, the smaller the diameter of an optical fiber, the more difficult it is to focus energy from the laser into the core. If the core diameter is smaller than that of the focused spot of the laser source, or if the focused radiant energy to the core is misaligned or greater than the fiber's acceptance angle, then energy will be transferred to structures that make up the coupler or that surround the core. The density is often great enough to soften, melt, or fuse any materials which are not highly optically transmissive or reflective. In many cases the energy density can be so great that photo thermal ablation may occur in the metal housing of the connector that couples the laser to the fiber, causing the metal to explosively form a plume mixture gases and micron size particles, which re-deposit and contaminate the focusing lens. Further lasing into the contamination can create extreme localized heating which ultimately destroys the focusing lens.

One solution to the problem of errant radiant energy is to divert the radiant energy along a second transmission path to a heat sink situated in, or comprising, the connector support structure, as disclosed in U.S. Pat. No. 5,179,610. As a result, it is necessary to modify the support structure to serve as a heat sink, and to provide a reflector capable of withstanding the radiation transmitted thereto by the secondary transmission path. The secondary transmission path is required to be highly transmissive (see col. 4, lines 31–39 of U.S. Pat. No. 5,179,610) and may be in the form of a quartz, glass, or Zirconium Fluoride collar having some heat dissipating effects, but primarily provided to guide the errant radiation to the reflector, while the reflector may be in the form of a multifaceted polished metal structure interference fitted into the connector, and the heat sink may be in the form of a metal element bolted to the fiber optic connector at an appropriate position.

The arrangement disclosed in U.S. Pat. No. 5,179,610 can, in theory, effectively divert radiation away from components of the fiber optic termination or connector, but implementation of the arrangement requires replacement of the conventional supporting structure, making it difficult to adapt the arrangement to existing fiber terminations. Further, the arrangement requires a reflector capable of withstanding the radiation to be dissipated, and a supporting structure that can effectively convert the radiation to heat and dissipate it without exposing the user or other surrounding structures to the resulting heat. As a result, the arrangement disclosed in U.S. Pat. No. 5,179,610 does not appear to be compatible with existing laser systems and connectors, and in particular does not appear to be well-adapted for use with standard medical laser industry connectors, such as the SMA 905 standard connector.

There is therefore a need for a coupling apparatus and method that minimizes the impact of radiant energy that fails to couple to the core of the optical fiber (or other primary optical transmission system), and further that can be fitted into existing termination arrangements, without the need to add a heat sink or modify the termination to safely dissipate the radiation. While heat sink structures may be utilized in the termination arrangement of the invention, they are designed to fit within the termination, and do not require a reflector.

c. The Problem of Coupling to the Cladding

In addition to dissipating radiant energy that fails to couple with the fiber, the present invention addresses the problem that, even when all of the energy that fails to couple to the fiber is dissipated, some of the energy that couples to the fiber will couple to the cladding of the fiber rather than to the core, causing the cladding to act as a secondary wave guide and leak energy into surrounding coating during tight bends, such as my occur when the optical fiber is used for laser lithotripsy after it has been passed through the working channel of an endoscope. While the amount of coupling may be reduced by tapering, the core and cladding may mix, causing light to also mix into the cladding, and higher order modes may be created which are more subject to loss during a bend than lower order modes. By way of background, it was proposed in U.S. Pat. No. 6,282,349 to fuse the cladding to the ferrule in which it is placed, but the cladding fusion scheme described in this patent did not involve removal of some or all of the cladding at the end of the fiber reduce coupling of laser energy into the cladding.

An improvement over the arrangement of U.S. Pat. No. 5,179,610 is disclosed in copending U.S. patent application Ser. No. 10/370,453, filed Feb. 24, 2003, by the same inventor as the present application. This copending patent application describe a laser-to-fiber coupling arrangement that can be used without an external heat sink, by reflecting the errant laser energy back into the laser itself. This has the advantage of not only eliminating the heat sink, but also of enabling use of a less expensive and more reliable single facet reflector. In addition, the patent application discloses the concept of roughening the end surface of a transparent ferrule to diffuse incoming radiation so as to reduce the density of radiation incident on the reflector. However, while this represents an improvement over the arrangement disclosed in U.S. Pat. No. 5,179,610, elimination of the reflector entirely would have the additional advantages of shortening the secondary transmission path, simplifying manufacture, and increasing the useful life of the apparatus. There is still a need for a laser-to-fiber coupling arrangement that reduces or eliminates coupling of focused radiant energy into the cladding of an optical fiber, rather than into the core, and yet does not require an external heatsink or any sort of reflector.

b. The Problem of Higher Order Modes

When light propagating down a fiber core exceeds the critical angle created by the core/cladding interface due to tight bends in the fiber, light will leak from the core into the adjacent cladding and outer coating surfaces. Damage to the cladding or coating will occur if these surfaces are unable to withstand the incident power or energy density. Continued damage to these surfaces can ultimately lead to total destruction or breakage of the overall fiber. Since higher order radiation modes are by definition modes in which the angle of incidence is relatively high, higher order modes are more likely to exceed the critical angle at a bend in the fiber, and therefore leak to the cladding.

There are two conventional ways to deal with this problem. The first is to use the largest fiber numerical aperture (N.A.), thereby increase the acceptable angles at which energy from the source propagates within the light conducting medium. The second is to reduce the input numerical aperture from the source, which also has the effect of increasing the acceptable propagation angles. However, both solutions are undesirable for many applications. Larger N.A.s are limited, due to choices of fiber core/clad materials versus transmission at a particular wavelength. The N.A. of fiber is determined by the refractive indices of the core/clad materials.

$$N.A.^2 = (n_{core}^2 - n_{clad}^2)$$

Therefore, choices of larger N.A. fibers are limited in many state of the art minimally-invasive surgical techniques involving, for example, scalpels or lithotripter fibers, while decreasing the numerical aperture of the radiation source is often impractical due to the already large installed base of lasers, theoretical limitations and FDA regulations on making modifications to existing lasers. The present invention is especially useful in such cases, i.e., where it is necessary for the fiber to effectively reduce the source N.A., although the invention can be used in any context where propagation of higher order radiant energy modes is of concern.

SUMMARY OF THE INVENTION

It is accordingly a first objective of the invention to provide an apparatus and method for coupling a laser to an optical fiber or other primary optical transmission system, in which energy that does not couple to the primary optical transmission system is diffused to prevent damage to components of the coupling connector, and which therefore extends the useful life of the connector, ensures efficient coupling of a portion of the radiant energy to the transmission system, enables the use of smaller transmission components, for example fibers with smaller diameters and/or acceptance angles, and that accommodates greater tolerances in aligning the transmission system to the radiant energy source, without the need for internal reflectors.

It is a second objective of the invention to provide an improved method of coupling a laser to an optical fiber in a way that facilitates use of relatively small optical fibers while minimizing damage to the coupling connector and components thereof, and yet that is compatible with standard laser coupling connectors, including medical laser industry standard metal connectors, and that does not require any external heat sinks that would interfere with such compatibility.

It is a third objective of the invention to provide an improved method of coupling a laser to an optical fiber in a way that facilitates use of relatively small optical fibers while minimizing damage to the coupling connector and components thereof, and yet that is compatible with standard laser coupling connectors, including medical laser industry standard metal connectors.

It is a fourth objective of the invention to provide an arrangement for coupling a laser to an optical fiber in a way that reduces or eliminates coupling to the cladding rather than the core.

It is a fifth objective of the invention to provide an apparatus and method for coupling a laser or other radiant energy source to an optical fiber or other primary optical transmission system, which has the effect of reducing higher order radiant energy modes.

These objectives are achieved, in accordance with the principles of a preferred embodiment of the invention, by a connector in which the optical fiber is surrounded by at least one diffuser for diffusing the radiant energy rather than simply converting it to heat and dissipating it in a heat sink. By diffusing the radiant energy in this manner, the preferred embodiment minimizes damage to the connector while in a simple, low cost manner that enables the connector to be manufactured to existing specifications, for use in existing laser devices without modification of the devices.

According to the principles of the invention, the diffuser may either consist of one or more roughened surfaces, of an alignment ferrule or prism element, or include one or more diffusion blocks, and may be combined with a heat sink.

Preferably, the connector has dimensions and accommodates a coupling nut or other mechanism that permits the connector to be used in place of a conventional connector of the type illustrated in FIG. 2, without the need to modify the apparatus in which it is to be used. For example, a preferred connector for use with the apparatus illustrated in FIG. 1 should be capable of coupling directly to coupling connector 18 of FIG. 1, in place of conventional connector 30, although it is of course within the scope of the invention to require an adapter.

Further, in order to achieve the objective of reducing or eliminating coupling to the cladding of the fiber, which is not solved by re-directing errant radiant energy, the invention provides for removal or tapering of a section of cladding and the terminus of the fiber, as described in U.S. patent application Ser. No. 10/370,453 and provisional U.S. Patent Application Ser. No. 60/482,445, filed Jun. 26, 2003. Unlike the coupler disclosed in U.S. Pat. No. 6,282,349, for example, the stripped fiber core of the present invention may be fused or welded directly to the supporting ferrule or diffusion elements.

Still further, in order to achieve the objective of reducing coupling of higher order modes, as described above, the invention provides for tapering a section of the fiber in such a manner that light entering the fiber at large critical angles are effectively collimated, i.e., bent towards the axis of the fiber. The taper may be provided anywhere along the length of the fiber, although it must precede any portion of the fiber that is likely to be bent in a way that might result in leakage.

DETAILED DESCRIPTION OF THE PREFERRED EMBODIMENTS

Figure 1:
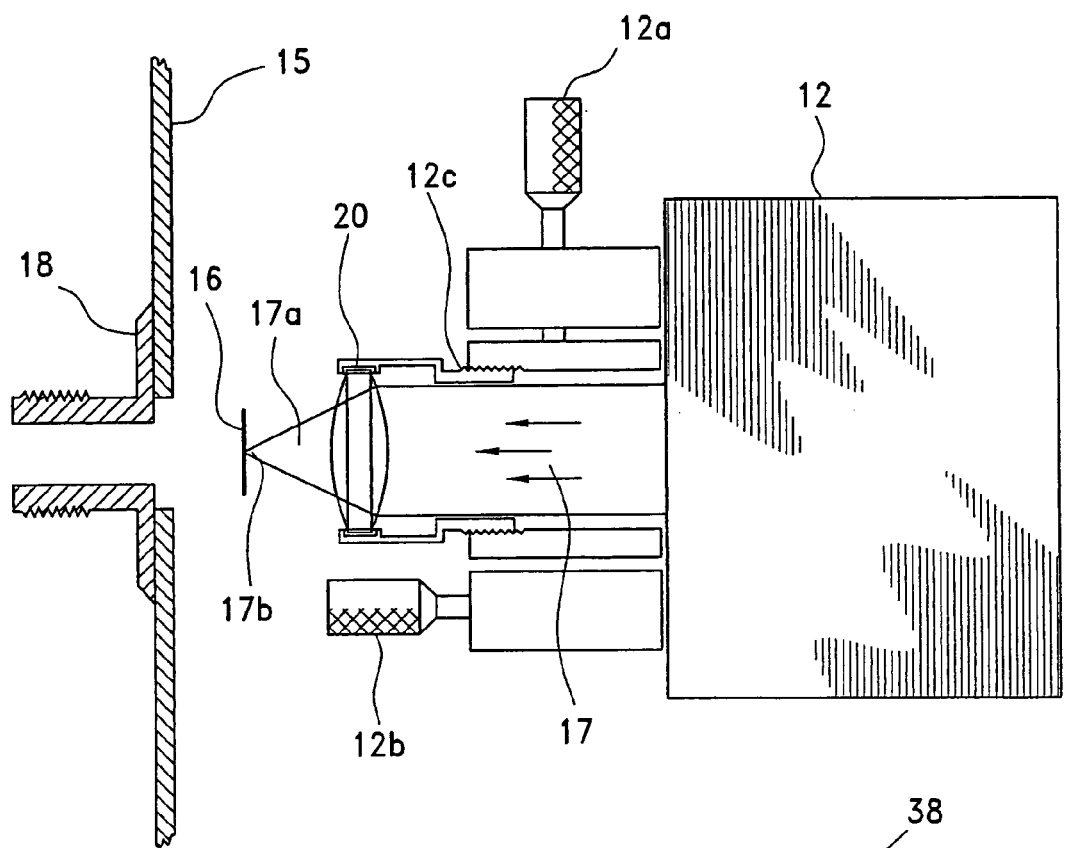
FIG. 1 is a plan view, partly in cross-section, showing a conventional radiant energy transmission system.
Figure 3:
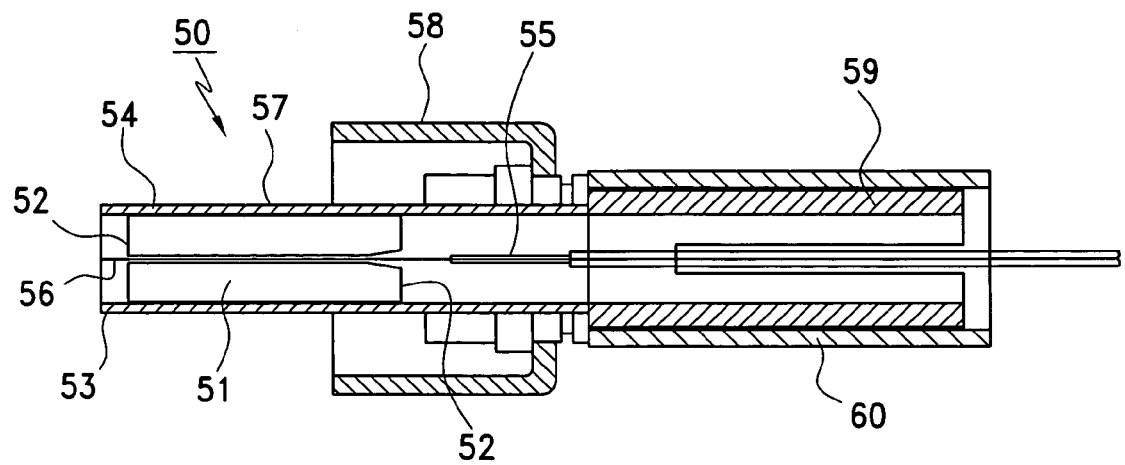
FIG. 3 is a cross-sectional view of a fiber optic connector constructed in accordance with the principles of a preferred embodiment of the invention.
Figure 4:
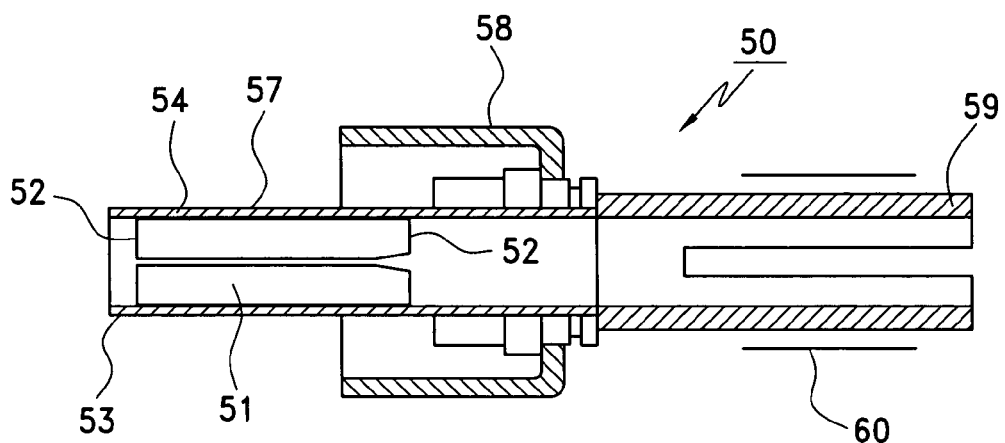
FIG. 4 is a cross-sectional view of the connector of FIG. 3, before installation of the optical fiber.

FIGS. 3 and 4 illustrate a connector constructed in accordance with the principles of a preferred embodiment of the invention, for coupling to a coupling connector corresponding to coupling connector 18 illustrated in FIG. 1. It will of course be appreciated by those skilled in the art that the principles of the invention may be applied to laser apparatus other than the apparatus illustrated in FIG. 1, and that the invention is not intended to be limited to a particular laser source or connector coupling arrangement.

Figure 2:
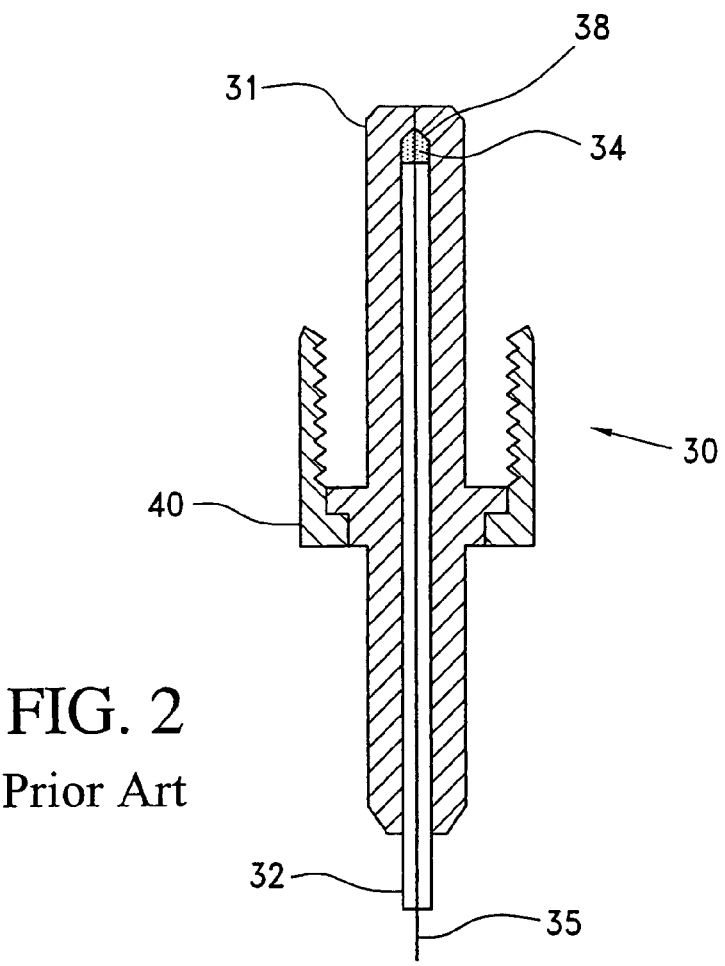
FIG. 2 is a cross-sectional view of a conventional fiber optic connector.

Turning to FIGS. 3 and 4, connector 50 is identical in size to connector 30 of FIG. 2, but differs in that the connector includes a transparent cylindrical alignment ferrule 51 having diffusers 52 at opposite ends. The diffusers are in the form of roughened surfaces of the ferrule 51, and in particular in the form of surfaces having a rough polish, although roughening may of course be achieved by means other than polishing, such as chemical or laser etching, and diffusion may of course also be achieved by applying means other than roughening the surfaces of the ferrule, such as application of diffusion coatings or providing bulk diffusion material. In addition, one rather than two of the surfaces of the ferrule may be coated. An example of a suitable roughness for medical laser applications, which is not intended to be limiting, is 40 microns.

Preferably, the termination end of the alignment ferrule/diffusion element 51 is set back from the distal end 53 of the connector housing 54 by a distance of approximately two times the diameter of the fiber cladding, with the fiber 55 itself extending to the end of the housing. This setback keeps the diffuser from interfering with laser interlock, lowers power density at the diffusion surface, and helps keep the fiber surface clean. The cladding at the exposed end 56 of the fiber 55 is preferably reduced in thickness or, optionally, stripped to reduce coupling of radiant energy to the fiber cladding.

In this embodiment, the ferrule may, by way of example and not limitation, be secured in the cylindrical housing 54 by applying adhesive through an adhesive port 57, and the housing may be provided with a standard coupling nut 58 for coupling with the laser apparatus. The fiber 55 is preferably stripped of the buffer and all other coatings, except the cladding, before insertion into the alignment ferrule 51 and securing of the fiber 55 to the connector 50 (and optionally stripped of cladding at the exposed end 56 as mentioned above), the cable (not shown) that includes the fiber being further secured to the housing 50 by a conventional crimp termination utilizing a crimp ferrule 59 and crimp ring 60. Details of the manner in which the fiber optical cable and fiber with buffer are secured to the connector form no part of the present invention and may be varied in numerous ways, as may the coupling structure used to couple the connector 50 to the laser apparatus, and any other connector details not involving the light diffusion or radiation dissipation path.

Figure 5:
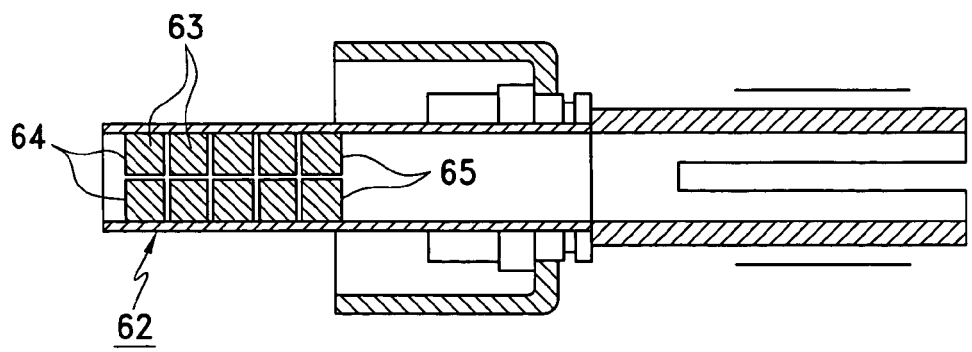
FIG. 5 is a cross-sectional view of a second preferred embodiment of the invention, which includes multiple diffusers blocks.

In the embodiment illustrated in FIG. 5, the single alignment ferrule 62 is made up of a plurality of diffusion elements 63, each having a diffusion surface 64 and joined together to form the alignment ferrule. A heat sink or beam blocking element or elements 65 may optionally be placed at the inner end of the diffusion elements to prevent passage of any diffused radiation that passes through the diffusers. The heat sink or beam blocking elements may optionally include roughened diffusing surfaces. The remaining elements of the connector of this embodiment, and those of FIGS. 6 and 7, may be identical to those described above in connection with FIG. 4, and are therefore not further described herein.

Figure 6:
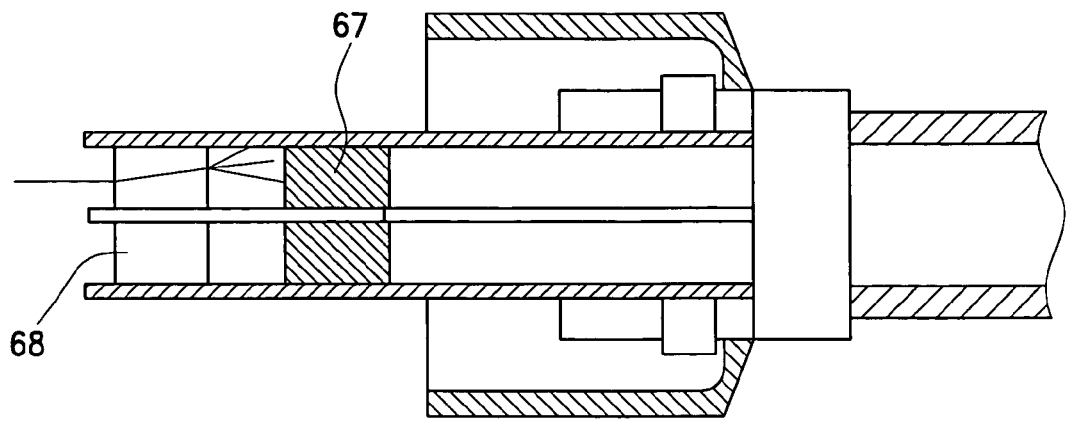
FIG. 6 is a cross-sectional view of a third preferred embodiment of the invention, which includes a heat sink.

Alternatively, as illustrated in FIG. 6, a single heat sink element 67 may be positioned behind the diffuser 68. As illustrated in FIG. 6, the diffuser only has a single diffusion surface, although any of the above-described diffusion configurations could be used with the heat sink of this embodiment.

Figure 7:
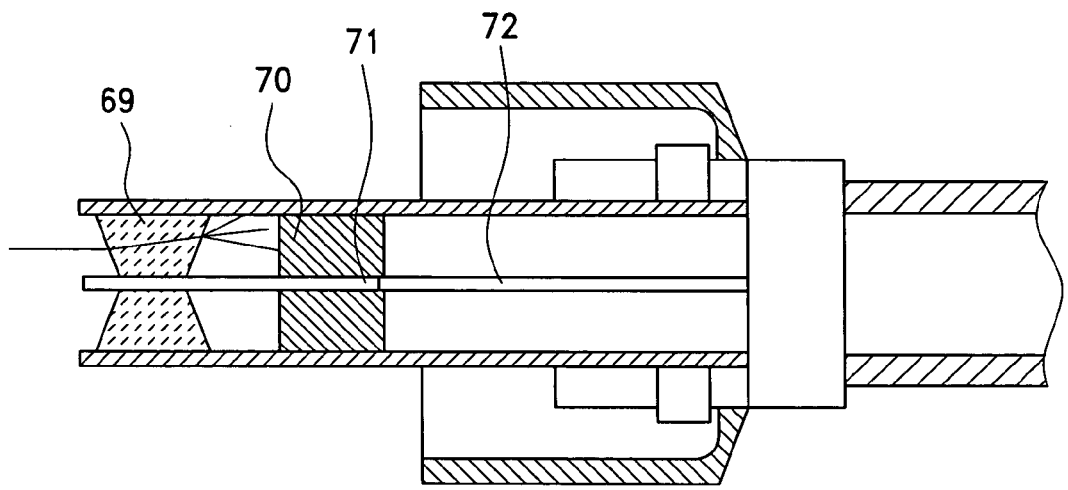
FIG. 7 is a cross-sectional view of a fourth preferred embodiment of the invention, in which the diffuser is a prism.

As illustrated in FIG. 7, the diffusion element may be in the form of a prism 69 to further disperse incoming errant radiation, optionally to a heat sink 70.

Figure 8:
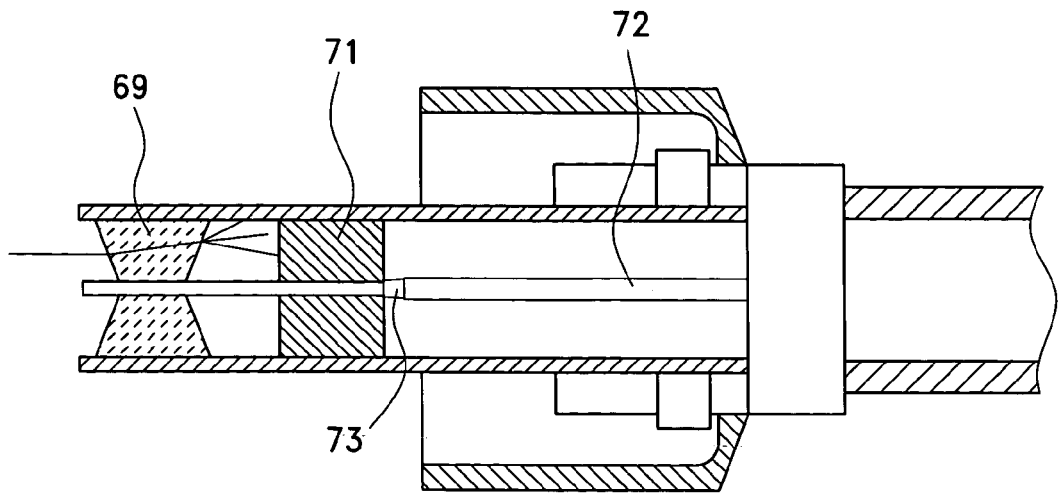
FIG. 8 is a cross-sectional view of a fifth preferred embodiment of the invention, in which an extended portion of the cladding is reduced in thickness or removed, the core and/or reduced-thickness cladding is fused directly to a heat sink, ferrule, or other supporting element, and a portion of the fiber behind the heat sink is tapered and/or fully clad, but stripped of the buffer.

As illustrated in FIG. 8, instead of just stripping the fiber 72 of its buffer or coating and leaving the cladding to be fused to the heat sink 70 or other supporting member, an extended portion of the fiber cladding may be reduced in thickness or entirely stripped and the reduced-thickness cladding or bare fiber core 71 fused or welded directly to the heat sink 70, thereby further minimizing coupling of radiation to the cladding. In addition, a portion of the coating and/or buffer 72 may also be removed at the downstream side 73 of the fiber, with the exposed cladding being optionally tapered or partially stripped.

As is apparent from the above-description and accompanying drawings, the method of the invention involves the steps of transferring radiant energy from a focused source by directing a focused region of the source to a predetermined plane; conducting a portion of the focused radiant energy incident on the plane along a first path; conducting the remaining portion of the focused radiant energy incident on the plane along a second path; and diffusing the remaining portion. The diffused radiation may optionally be converted to heat and further dissipated by a heat sink.

Figure 9:
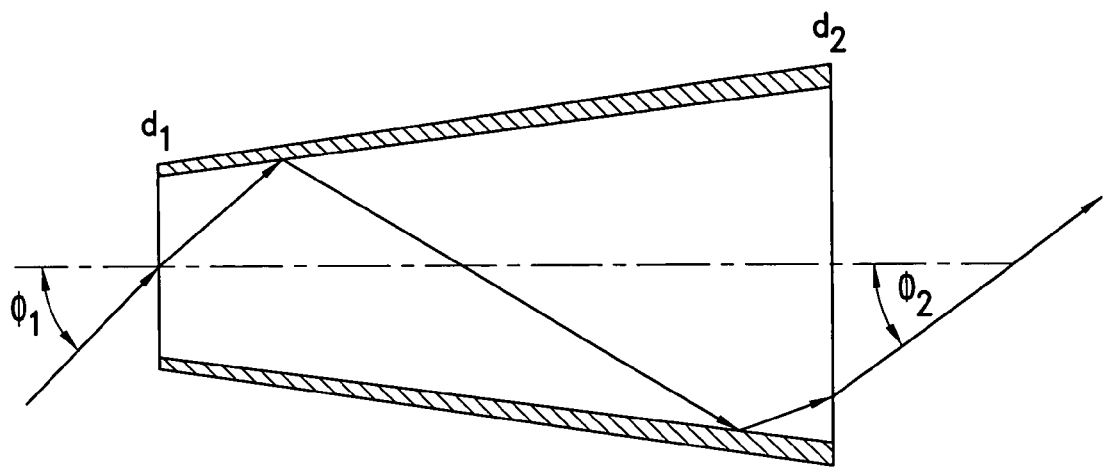
FIG. 9 is a schematic cross-sectional view of a tapered fiber, illustrating the manner in which a tapered fiber decreases higher order propagation modes.

Finally, in order to solve the further problem of coupling of higher order modes that may cause damage at fiber bends, the invention provides for optional tapering of the termination end of the fiber. As illustrated in FIG. 9, light entering a tapered fiber at an angle $\Phi_1$ relative to the axis of the fiber, and that reflects at least twice at the interface between the conducting medium and the cladding, will exit the fiber at an angle $\Phi_2$ (also relative to the axis) that is smaller by an amount given by the formula:

$$d_1(\sin \Phi_1) = d_2(\sin \Phi_2).$$

This ratio follows from the basic principle that the angle of reflection is equal to the angle of incidence. As a result, the angle of rays entering a tapered fiber will shift towards the fiber axis, effectively collimating the light and eliminating higher order propagation modes.

By way of example, typical input numerical apertures from pulsed Holmium lasers are on the order of 0.15, with a spot size of 250 microns. Reducing a 300 micron core fiber input ($d_2$) to a 200 micron core fiber input ($d_1$) reduces the effective input numerical aperture from 0/15 to 0/10. Compromises between minimum fiber coupling losses and the maximum fiber bends will have to be considered in each individual application. In many holmium laser lithotripsy applications, for example, lasers having up to 80 watts are often used, even though only 10 watts are required. In those applications, coupling efficiency could easily be sacrificed for increased tolerance of fiber bends.

Figure 10:
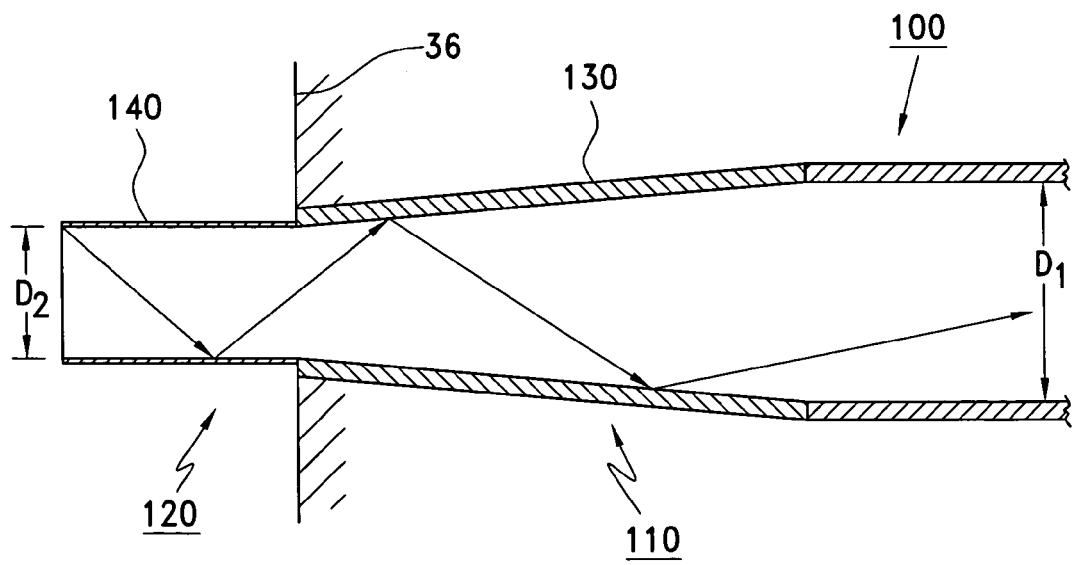
FIG. 10 is a schematic drawing showing an example showing the inclusion of a tapered fiber section in a connector of the type illustrated in FIGS. 3–8.

Although a discrete tapered section is shown in FIG. 9, it will be appreciated that the collimating effect will occur in any fiber having a tapered section, irrespective of whether the tapered section is at the end of the fiber. As a result, the principles of the invention may be applied to a connector of the type in which the cladding at the coupling end of the fiber is reduced in thickness or stripped to prevent coupling of radiation to the cladding. As illustrated in FIG. 10, a fiber 100 having diameter D1 terminates in a tapered section 110 having cladding 130 for reducing higher order propagation modes and a coupling section 120 having a diameter D2. Coupling section 120 may include cladding 140 of reduced thickness or no cladding at all to prevent coupling of radiation to the cladding It will be appreciated that it is not essential that the stripped or reduced-cladding-thickness coupling section 120 be included, if coupling of errant radiation to the cladding does not present a problem. Instead, radiation could couple directly into the tapered section. In that case, the cladding 130 of the tapered section 110 may itself be tapered, in the manner shown in FIG. 5, to reduce coupling of errant radiation. On the other hand, the cladding of the tapered section may have a uniform thickness.

Having thus described a preferred embodiment of the invention in sufficient detail to enable those skilled in the art to make and use the invention, it will nevertheless be appreciated that numerous variations and modifications of the illustrated embodiment may be made without departing from the spirit of the invention, and it is intended that the invention not be limited by the above description or accompanying drawings, but that it be defined solely in accordance with the appended claims.

I claim:

1. A fiber optic connector for terminating an optical fiber, wherein the fiber is surrounded by at least one diffuser through which radiant energy that fails to couple to the fiber passes, wherein said diffuser is a member that surrounds the fiber, said diffuser being arranged to dissipate said radiant energy as it passes through said member, and said member having an axis and end surfaces perpendicular to said axis.

2. A fiber optic connector as claimed in claim 1, wherein the diffuser includes at least one surface of said member surrounding the fiber.

3. A fiber optic connector as claimed in claim 1, wherein the diffuser is an alignment ferrule.

4. A fiber optic connector for terminating an optical fiber, wherein the fiber is surrounded by at least one diffuser for diffusing radiant energy that fails to couple to the fiber, the diffuser is a prism element that surrounds the fiber, and said diffuser has an axis and end surfaces perpendicular to said axis.

5. A fiber optic connector as claimed in claim 1, wherein the diffuser comprises at least one diffusion block.

6. A fiber optic connector for terminating an optical fiber, wherein the fiber is surrounded by at least one two diffusers for diffusing radiant energy that fails to couple to the fiber, and at least one of said diffusers has an axis and end surfaces perpendicular to said axis.

7. A fiber optic connector as claimed in claim 1, further comprising a heat sink in contact with the diffuser.

8. A fiber optic connector as claimed in claim 1, wherein a cladding of the fiber is partially removed from a predetermined length of the fiber at a termination end to reduce coupling of radiant energy into the cladding.

9. A fiber optic connector as claimed in claim 8, wherein the partially removed cladding is fused or welded directly to the diffuser.

10. A fiber optic connector as claimed in claim 1, wherein a section of the fiber is tapered in such a manner that an end of the fiber through which light enters the fiber is narrower than a section of fiber away from said end such that light entering the fiber at critical angles larger than a predetermined critical angle is bent towards an axis of the fiber.

11. A fiber optic connector as claimed in claim 1, wherein at least one of said end surfaces is roughened to diffuse light as it passes through said one of said end surfaces.

12. A fiber optic connector as claimed in claim 11, wherein said one of said end surfaces faces a source of said radiant energy.

13. A fiber optic connector as claimed in claim 11, wherein said one of said end surfaces is at an opposite end of said diffuser from an end surface that faces a source of said radiant energy.

14. A fiber optic connector as claimed in claim 11, wherein both of said end surfaces are roughened to diffuse light as it passes through said end surfaces.

15. A fiber optic connector for terminating an optical fiber, wherein the fiber is surrounded by at least one diffuser through which radiant energy that fails to couple to the fiber passes, wherein said diffuser is a member that surrounds the fiber, said diffuser being arranged to dissipate said radiant energy as it passes through said member, and said diffuser having end surfaces at opposite ends, wherein one of said end surfaces is at an opposite end of said diffuser from an end surface that faces a source of said radiant energy, said end surface at the opposite end of said diffuser being roughened to diffuse light as it exits said diffuser.

16. A fiber optic connector as claimed in claim 15, wherein both of said end surfaces are roughened to diffuse light as it passes through said end surfaces.

* * * * *